3,029,188
GELATIN ADHESIVE PHARMACEUTICAL PREPARATIONS

Gilman N. Cyr and Harris B. Bernstein, New Brunswick, N.J., assignors to Olin Mathieson Chemical Corporation, New York, N.Y., a corporation of Virginia
No Drawing. Filed Feb. 20, 1958, Ser. No. 716,284
9 Claims. (Cl. 167—60)

This invention relates to new compositions of matter and more particularly to new pharmaceutical preparations useful as denture adhesives and/or as vehicles for the topical application of pharmacologically active materials to the mucous membranes of the body (especially those of the oral cavity).

Prior to the present invention, available denture adhesives have been found to be deficient in many characteristics. Many of the adhesives heretofore known have been found to be troublesome in their application to the dentures and/or the denture bearing mucous membranes of the mouth; have resulted in an unevenness of spreading on the palate during use have necessitated replacement many times during the course of the day; have not been pleasant to wear; and have been found to possess a distinct taste.

It has now been found that by the use of the compositions of this invention as denture adhesives, these various disadvantages can be overcome in that these compositions possess a superior ease of application and evenness of spreading on the denture and thence on the palate during use; possess a longer duration of useful activity; possess superior retentive properties; are pleasant to wear; are tasteless; and, possess the additional and most important feature of enabling a better fit for the denture, thereby reducing the irritation which would naturally result from an ill-fitting denture.

In the ordinary use of full dentures or dental plates, there is often an imperfect fit due to shrinkage of the gums and/or other reasons. The compositions of this invention, when applied to these dental plates, act as an adhesive and permit a satisfactory adaptation of denture to tissue by virtue of their fill-in, sealing, and setting properties.

The compositions of this invention may also be used as vehicles for the topical administration of pharmacologically active materials to the mucous membranes of the body (especially the oral cavity but including such other areas as the vagina, the rectum, etc.). These compositions have the advantage of enabling longer durations of exposure of the material to the affected area, and of enabling a greater ease of application of said material. The incorporation of a wide variety of pharmacologically active materials (therapeutic agents, medicaments) in the compositions of this invention is possible. These include, inter alia, topical anesthetics, corticosteroids, sex hormones, vitamins, antibiotics and antiseptics.

Additional uses of the compositions of this invention include, inter alia, bland protective coverings for the mucous membrane, in periodontal surgery, as surgical packs, as socket packings to stop hemorrhage from the dental sockets, holding pumice from splattering during dental prophylaxis, applying sodium fluoride to children's teeth, applying a desensitizer to teeth for an extended period, and aiding in the adjustment of the occlusion and the bite.

It, therefore, is an object of this invention to provide a viscous pharmaceutical composition useful as a denture adhesive which is safe and effective, may be easily applied to the dentures and is effective over an extended period of time.

Still a further object of this invention is the provision of a viscous pharmaceutical composition suitable for use as a vehicle for the more effective topical application of pharmacologically active materials to the mucous membranes of the body and especially to those of the oral cavity.

This invention also comprises such other objects, advantages and capabilities as will later more fully appear and which are inherent in the compositions of this invention.

The viscous compositions of this invention essentially comprise an intimate admixture of particulate gelatin with mineral oil containing a thickening agent dispersed therein.

The oils which may be used and which are embraced within the term "mineral oil" as used herein are the oils which are liquid at any temperature in the range from 0°C. to 60° C. and which are essentially hydrocarbons occurring in mineral oil, their distillates and their cracked or polymerized derivatives, an example of the last being polybutene which includes the polymers of butylene and its isomers. The mineral oil may be of any desired character or viscosity, from one which is a thin liquid to one which is so thick that it does not flow at ordinary temperature (20° C.).

Thickening (gelling) agents utilizable for dispersion in the mineral oil include, inter alia paraffin wax, amorphous wax (e.g. microcrystalline wax), ozokerite, animal waxes (e.g. beeswax), vegetable waxes (e.g. castor wax), and hydrocarbon polymers (e.g. polymers of ethylene having an average molecular weight varying from 3,500 to 26,000 and polyisobutylene of a high molecular weight). The preferred thickening agent is polyethylene having a molecular weight of at least 3,500.

More particularly, the viscous compositions of this invention essentially comprise an intimate admixture of particulate gelatin with mineral oil containing dispersed therein polyethylene having a molecular weight of at least 3,500 in an amount equal to approximately 0.25% to 50% of the combined weight of the polyethylene and the mineral oil, the gelatin preferably representing about 5–75% by weight of the composition and optimally about 30–60% and the polyethylene-mineral oil dispersion representing about 95–25% by weight of the composition and optimally about 70–40%.

A preferred embodiment of this invention is a viscous pharmaceutical composition essentially comprising an antiseptic, and an intimate admixture of particulate gelatin with mineral oil containing dispersed therein polyethylene having a molecular weight of at least 3,500 in an amount equal to approximately 0.25% to 50% of the combined weight of polyethylene and mineral oil, the antiseptic preferably representing about 0.05–10% by weight of the composition depending on the antiseptic.

Antiseptics utilizable include, inter alia, hexachlorophene, tetramethyl thiuramdisulfide, benzalkonium chloride, thimerosal, hexylresorcinol, cresols (e.g. Cresatin, Merck-Sharpe and Dohme), zinc oxide, methylene blue, boric acid, chloramine-T, gentian violet, phenyl mercuric acetate, phenyl mercuric chloride, phenyl mercuric nitrate basic, acriflavin, sodium perborate, metallic peroxides (e.g. sodium peroxide), sodium permanganate, and the halogens.

By use of the preferred embodiment of this invention, there is supplied a denture plate adhesive which has antiseptic properties, and which will prevent the growth of organisms ordinarily found in the oral cavity; which will inhibit the growth of or kill bacteria, thereby preventing putrefaction of food under the denture plate; and, will act as a deodorant in the control and prevention of the emanation of odors from the mouth.

Portions of the gelatin of these compositions may be substituted by other gums, said substitution to be such that at least about 5% (by weight of the composition) of gelatin is retained. Such gums which may be added to the compositions of this invention include, inter alia, carboxymethylcellulose, pectin, karaya gum, tragacanth, Irish moss extracts, alginates, polyvinyl pyrrolidone, carob gum, guar gum and pre-treated water-soluble starch (e.g. Nu Film, National Starch Products).

A preservative may also be added to the compositions of this invention. Such preservatives which may be added, depending upon the antiseptic (if any) utilized in the composition intended for use as a denture adhesive and, the pharmacologically active material utilized when said composition is intended for use as a vehicle, include, inter alia, methyl paraben, propylparaben, esters of parahydroxybenzoic acid, sorbic acid, volatile oils (e.g. peppermint, wintergreen, cinnamon), benzoic acid and its salts.

If it is desired to vary the taste and/or color features of the compositions of this invention, this may be done by the addition of essential oils, synthetic aromatics or other similar flavoring materials (for taste) and, suitable oil-soluble Food Drug and Cosmetic or Drug and Cosmetic dyes or inert pigments (for color).

The following examples are illustrative but not limitative of the invention. (Examples I—V being those of preparations intended for use as a denture adhesive and Examples VI—X being those of preparations intended for use as vehicle):

*Example I*

| | Grams |
|---|---|
| Gelatin (finely powdered) | 50 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The gelatin is introduced into the bowl of a planetary type mixer (e.g. Hobart, Glen, Pony), covered with the dispersion of (a) and blended until homogeneous.

(b') *Alternative method.*—The gelatin is introduced into the bowl of a planetary type mixer. One-third of the dispersion of (a) is added with stirring until a homogeneous mixture is obtained at which point the remainder of (a) is added with mixing continuing until a homogeneous product results.

*Example II*

| | Grams |
|---|---|
| Gelatin (finely powdered) | 49 |
| Hexachlorophene (finely powdered) | 1 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The hexachlorophene is blended with an equal weight of the dispersion of (a) in a planetary type mixer and then the material is passed through a roller mill (e.g. Ross Engineering Co. Roller Mill). To 2 gm. of milled material is added 2 gm. of the dispersion (a) with mixing in a planetary type mixer until homogeneous. Again add (a) in an amount equal to that in the planetary mixer and mix until homogeneous. Continue this geometric addition process until the dispersion (a) has been completely utilized.

(c) The gelatin is introduced into the bowl of a planetary type mixer, covered with the hexachlorophene polyethylene-mineral oil dispersion of (b) and blended until homogeneous.

*Example III*

| | Grams |
|---|---|
| Gelatin (finely powdered) | 16 |
| Hexachlorophene (finely powdered) | 2 |
| Pectin (finely powdered) | 16 |
| Carboxymethylcellulose (finely powdered) | 16 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The gelatin, pectin and carboxymethylcellulose are blended in a powder blender (e.g. Hobart Mixer).

(c) The hexachlorophene is blended with (a) as described in Example II (b).

(d) The blends (b) and (c) are introduced into the bowl of a planetary type mixer, (b) being covered with (c) and blended until homogeneous.

*Example IV*

| | Grams |
|---|---|
| Gelatin (finely powdered) | 50 |
| Mineral oil | 47.5 |
| Castor wax | 2.5 |

(a) A castor-wax-mineral oil dispersion is prepared as described in U.S. Patent No. 2,628,187, the castor wax replacing the polyethylene.

(b) The gelatin is introduced into the bowl of a planetary type mixer, covered with the dispersion of (a) and blended until homogeneous.

*Example V*

| | Grams |
|---|---|
| Gelatin (finely powdered) | 50 |
| Mineral oil | 47.5 |
| Beeswax | 2.5 |

(a) A beeswax-mineral oil dispersion is prepared as described in U.S. Patent No. 2,628,187, the beeswax replacing the polyethylene.

(b) The gelatin is introduced into the bowl of a planetary type mixer, covered with the dispersion of (a) and blended until homogeneous.

*Example VI*

| | Grams |
|---|---|
| Gelatin (finely powdered) | 47 |
| Nystatin (finely powdered) | 3 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The nystatin is dispersed in (a) following the procedure of Example II (b).

(c) The gelatin is introduced into the bowl of a planetary type mixer, covered with (b) and blended until homogeneous.

*Example VII*

| | Grams |
|---|---|
| Gelatin (finely powdered) | 49.5 |
| Thiostrepton (finely powdered) | 0.5 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The thiostrepton is dispersed in (a) following the procedure of Example II (b).

(c) The gelatin is introduced into the bowl of a planetary type mixer, covered with (b) and blended until homogeneous.

*Example VIII*

| | Grams |
|---|---|
| Gelatin (finely powdered) | 48 |
| P-ethoxybenzoic acid ester with diethylaminoethanol (Intracaine) | 2 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The Intracaine is blended with (a) following the procedure of Example II (b), omitting the use of the roller mill.

(c) The gelatin is introduced into the bowl of a planetary type mixer covered with (b) and blended until homogeneous.

Example IX

| | Grams |
|---|---|
| Gelatin (finely powdered) | 49.8 |
| 9α-fluorohydrocortisone acetate (finely powdered) | 0.2 |
| Mineral oil | 47.5 |
| Polyethylene (mol. wt. 21,000) | 2.5 |

(a) A polyethylene-mineral oil dispersion is prepared as described in U.S. Patent No. 2,628,187.

(b) The 9α-fluorohydrocortisone acetate is blended with (a) following the procedure of Example II (b).

(c) The gelatin is introduced into the bowl of a planetary type mixer, covered with (b) and blended until homogeneous.

Example X

| | | |
|---|---|---|
| Gelatin (finely powdered) | gm | 50 |
| Estradiol valerate (finely powdered) | mgm | 5 |
| Mineral oil | gm | 47.5 |
| Polyethylene (mol. wt. 21,000) | gm | 2.5 |

(a) A polyethylene-mineral oil dispersion is prepared as described in U.S. Patent No. 2,628,187.

(b) The estradiol valerate is blended with (a) following the procedure of Example II (b).

(c) The gelatin is introduced into the bowl of a planetary type mixer, covered with (b) and blended until homogeneous.

The invention may be variously otherwise embodied within the scope of the appended claims.

What is claimed is:

1. An anhydrous viscous pharmaceutical composition consisting essentially of an intimate admixture of from about 5% to about 75% by weight of particulate gelatin with from about 95% to about 25% by weight of mineral oil having a thickening agent selected from the group consisting of waxes and hydrocarbon polymers dispersed therein, said thickening agent being present in an amount equal to approximately 0.25% to about 50% of the combined weight of the mineral oil and thickening agent.

2. The composition of claim 1 in which the particulate gelatin is present in the proportion of from about 30% to about 60% by weight and the mineral oil-thickener dispersion is present in the proportion of from about 70% to about 40% by weight.

3. The composition of claim 1 in which the thickening agent is castor wax.

4. The composition of claim 1 in which the thickening agent is beeswax.

5. An anhydrous viscous pharmaceutical composition consisting essentially of an antiseptic and an intimate admixture of from about 5% to about 75% by weight of particulate gelatin with from about 95% to about 25% by weight of mineral oil containing dispersed therein polyethylene having a molecular weight of at least 3,500 in an amount equal to approximately 0.25% to 50% of the combined weight of polyethylene and mineral oil.

6. An anhydrous topically applicable viscous pharmaceutical composition consisting essentially of a pharmacologically active material and an intimate admixture of from about 5% to about 75% by weight of particulate gelatin with from about 95% to about 25% by weight of mineral oil containing dispersed therein polyethylene having a molecular weight of at least 3,500 in an amount equal to approximately 0.25% to 50% of the combined weight of polyethylene and mineral oil.

7. An anhydrous vehicle for the topical application of pharamacologically active materials consisting essentially of an intimate admixture of from about 5% to about 75% by weight of particulate gelatin with from about 95% to about 25% by weight of mineral oil containing dispersed therein polyethylene having a molecular weight of at least 3,500 in an amount equal to approximately 0.25% to 50% of the combined weight of polyethylene and mineral oil.

8. The composition of claim 7 with a topical anesthetic.

9. An anhydrous viscous pharmaceutical composition consisting essentially of pectin, carboxymethylcellulose and an intimate admixture of from about 5% to about 75% by weight of particulate gelatin with from about 95% to about 25% by weight of mineral oil containing dispersed therein polyethylene having a molecular weight of at least 3,500 in an amount equal to approximately 0.25% to 50% of the combined weight of polyethylene and mineral oil.

References Cited in the file of this patent

UNITED STATES PATENTS

| 2,178,569 | Ferguson | Nov. 7, 1939 |
| 2,183,084 | Reynolds | Dec. 12, 1939 |
| 2,343,308 | Little | Mar. 7, 1944 |
| 2,628,205 | Shoemaker | Feb. 10, 1953 |

OTHER REFERENCES

Sollmann: A Manual of Pharmacology, 7th ed., W. B. Saunders Co., Phila. (1948), p. 56.

Schackelford et al.: J.A.P.A., Sci. Ed., vol. 32, (1943), pp. 163–165.

Mutimer: J.A.P.A, Sci. Ed., vol. 45, No. 2, February 1956, pp. 101–105.

Alexander: Glue and Gelatine, Chem. Catalog, Co., N.Y. (1923), pp. 200–204.

Hackh: Chemical Dictionary, 3rd ed., McGraw-Hill Book Co., N.Y., (1944), p. 372.